W. D. EVANS.
Cotton-Chopper.

No. 166,597. Patented Aug. 10, 1875.

WITNESSES:
W. W. Hollingsworth
John O. Kenion

INVENTOR:
Wm. D. Evans
BY
ATTORNEYS.

UNITED STATES PATENT OFFICE.

WILLIAM D. EVANS, OF SOCIETY HILL, SOUTH CAROLINA.

IMPROVEMENT IN COTTON-CHOPPERS.

Specification forming part of Letters Patent No. 166,597, dated August 10, 1875; application filed July 1, 1875.

*To all whom it may concern:*

Be it known that I, WILLIAM D. EVANS, of Society Hill, in the county of Darlington and State of South Carolina, have invented a new and Improved Cotton-Chopper; and I do hereby declare that the following is a full, clear, and exact description of the same, reference being had to the accompanying drawing, forming a part of this specification, in which—

Figure 1:
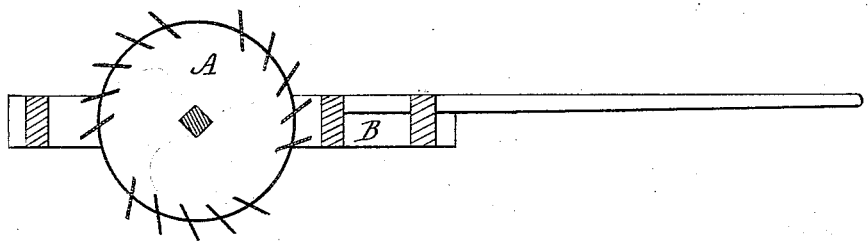
Figure 2:
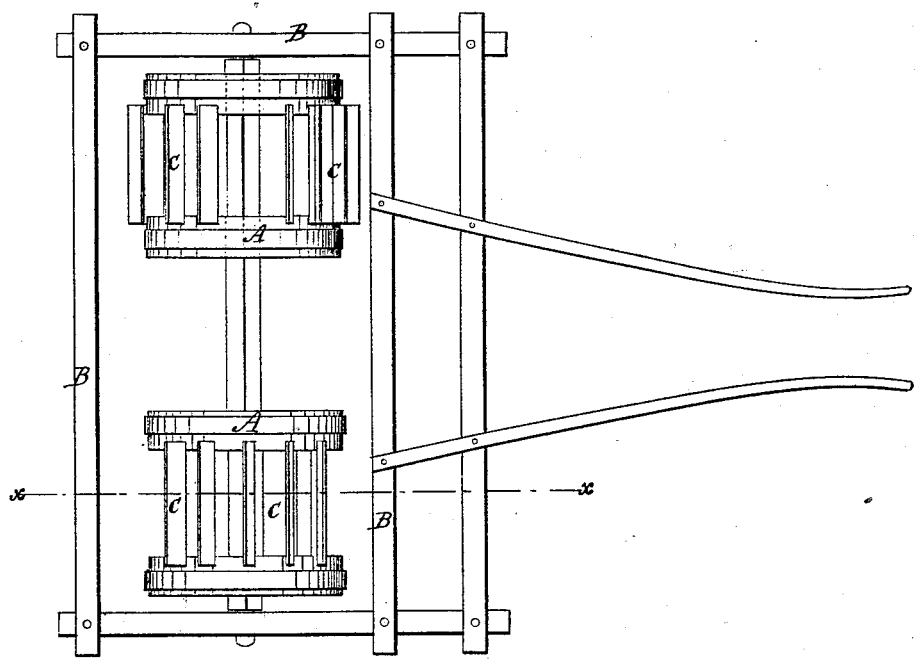

Figure 1 is a sectional elevation in line $x\ x$ of Fig. 2; Fig. 2, a plan view.

The invention will first be described in connection with drawing, and then pointed out in claim.

A A represent drums journaled in a frame, B, and provided each with blades C attached to their perimeters, and reversely inclined to the center from blades intended to spade and lift the soil, the device being intended to roll on cotton-beds. As the drums roll over the earth the blades are pressed into it so as to cut up and destroy all plants, grass, &c., with which they come into contact. In the spaces where the blades are omitted the plants are left standing and uninjured, their width being regulated to suit the distance apart which is desired between the plants. By using two drums on the same shaft or axle, so as to be movable thereon, I can readily adjust the cutter-rolls to any width of rows, always doing double the usual quantity of work with only one horse. The drums themselves will, however, without any adjustment, allow for considerable variation in the distance between rows.

What I claim as new is—

In a cotton-chopper, the drums A A and irregularly-spaced transverse cutting-blades C reversely inclined to the center, combined as and for the purpose specified.

WILLIAM D. EVANS.

Witnesses:
E. M. GODFREY,
W. R. GODFREY.